(12) United States Patent
Yao et al.

(10) Patent No.: US 6,628,104 B2
(45) Date of Patent: Sep. 30, 2003

(54) LOAD-OFF TRANSIENT ACCELERATION GENERATOR CONTROL APPARATUS/METHOD

(75) Inventors: Yuan Yao, Mississauga (CA); Wally Malicki, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 18 days.

(21) Appl. No.: 09/932,343

(22) Filed: Aug. 17, 2001

(65) Prior Publication Data
US 2002/0117999 A1 Aug. 29, 2002

Related U.S. Application Data
(60) Provisional application No. 60/267,448, filed on Feb. 8, 2001.

(51) Int. Cl.[7] .............................. H02P 9/10; H02P 9/14; H02P 9/00
(52) U.S. Cl. ............................................. 322/59; 322/44
(58) Field of Search ..................................... 322/59, 44

(56) References Cited

U.S. PATENT DOCUMENTS

| | | | | |
|---|---|---|---|---|
| 4,035,712 A | * | 7/1977 | Yarrow et al. ................. | 322/24 |
| 4,219,769 A | * | 8/1980 | Macfarlane et al. .......... | 322/28 |
| 4,262,242 A | | 4/1981 | Glennon ....................... | 322/28 |
| 4,442,396 A | * | 4/1984 | Hucker ......................... | 322/21 |
| 4,486,801 A | | 12/1984 | Jackovich et al. ............ | 361/21 |
| 4,973,896 A | * | 11/1990 | Shiga et al. .................. | 322/28 |
| 4,992,920 A | | 2/1991 | Davis ............................ | 363/36 |
| 5,070,229 A | * | 12/1991 | Takatsuka et al. .......... | 219/203 |
| 5,397,975 A | * | 3/1995 | Syverson ...................... | 322/46 |
| 5,502,368 A | * | 3/1996 | Syverson et al. ............. | 322/28 |
| 5,508,601 A | | 4/1996 | Good et al. ................... | 322/37 |
| 5,550,455 A | | 8/1996 | Baker ........................... | 322/23 |
| 5,554,923 A | | 9/1996 | Maddali et al. ............... | 322/25 |
| 5,594,322 A | | 1/1997 | Rozman et al. ............... | 322/10 |
| 5,631,544 A | * | 5/1997 | Syverson et al. ............. | 322/46 |
| 5,656,922 A | * | 8/1997 | LaVelle et al. ................ | 322/46 |
| 5,747,971 A | * | 5/1998 | Rozman et al. ............... | 322/10 |
| 5,793,625 A | * | 8/1998 | Balogh ......................... | 363/89 |
| 5,801,516 A | | 9/1998 | Rice et al. .................... | 322/37 |
| 5,850,138 A | | 12/1998 | Adams et al. ................ | 322/68 |
| 6,031,739 A | * | 2/2000 | He et al. ....................... | 363/44 |
| 6,075,716 A | * | 6/2000 | He et al. ....................... | 363/44 |
| 6,545,884 B2 | * | 4/2003 | Curtiss ......................... | 363/37 |

FOREIGN PATENT DOCUMENTS

| | | |
|---|---|---|
| DE | 39 29 938 A1 | 3/1991 |
| GB | 1 174 641 A | 12/1969 |
| IT | 1 209 369 B | 7/1989 |

* cited by examiner

Primary Examiner—Nestor Ramirez
Assistant Examiner—Pedro J. Cuevas
(74) Attorney, Agent, or Firm—Larry J. Palguta

(57) ABSTRACT

A generator control unit (200) includes a field current modulator (212) that repeatedly switches between an ON state and an OFF state to control the flow of field current to the generator (20), a free-wheeling path (216) that feeds excitation current from the generator (20) back to the generator (20) as a field current component when the field current modulator (212) is in the OFF state, and an impedance circuit (220) that selectively and temporarily absorbs excitation current in the free-wheeling path (216) to reduce voltage overshoot of the generator (20) upon occurrence of an operating transition, such as a transition from high load to low load. In one implementation, the impedance circuit (220) is an RC circuit and a by-pass switch (222) is provided across the RC circuit. When excitation current in the free-wheeling path (216) is not to be absorbed by the RC circuit, the by-pass switch (222) is ON, thereby providing a low-impedance path for the excitation current. A by-pass driver (230) controls the by-pass switch (222) to change the by-pass switch (222) from ON to OFF based on one or more detection signals, e.g., indicating a load transition or power-up, thereby introducing the impedance circuit (220) into the free-wheeling path (216) to effect decay of the excitation current from the generator (20).

29 Claims, 5 Drawing Sheets

LOAD-OFF TRANSIENT ACCELERATION GENERATOR CONTROL APPARATUS/METHOD

RELATED APPLICATION

This application claims priority under 35 U.S.C. §119(e) of U.S. Provisional Application Ser. No. 60/267,448, filed on Feb. 8, 2001, the entire contents of which are herein incorporated by reference.

BACKGROUND OF THE INVENTION

1. Field of the Invention

This invention relates to electrical power generation.

2. Description of Related Art

Electrical power for military and commercial aircraft is typically generated by either an AC or DC generator that is controlled by regulating the voltage at a "point-of-regulation" (POR) to a specified level. To regulate the POR voltage, a generator control unit (GCU) modulates a generator excitation source voltage so that an ideal excitation current is maintained according to the load and speed conditions. When load on the generator is increased, the GCU must increase an exciter field current to compensate for a POR voltage drop caused by the extra load. When load on the generator decreases, the GCU must reduce the generator exciter field current so that the POR voltage will not be too high. In other words, the GCU must compensate for load transitions (e.g., high load to low load, or vice versa) by increasing or decreasing the exciter field current. If load transition compensation is not achieved quickly, the POR voltage could fall outside a specified limit, thereby causing utilization equipment malfunction and/or damage.

FIG. 1 illustrates a conventional generator control configuration for typical aircraft AC power generation systems. As seen in FIG. 1, a conventional generator control unit 10 includes the following main elements: (a) a field current modulation switch 12; (b) a field current modulation switch driver 14; and (c) and a free wheeling diode 16. The generator control unit 10 is connected to an exciter stator winding 22 of a generator 20 via lines 17 and 18 to provide a field current $I_f$. As is well known, the flow of field current $I_f$ through the exciter stator winding 22 of an AC generator induces a voltage in an exciter rotor winding 24 of the generator 20, which is rectified by a rectifier 26. The resulting rectified voltage is applied to a field winding 28, which induces an AC voltage in a generator main winding 29 for distribution to electrical loads of the aircraft via feeders (not shown). The field current modulation switch 12, which is typically either a MOSFET (metal-oxide-semiconductor field-effect transistor) or an IGBT (insulated-gate field-effect transistor), is connected to line 18 and between the exciter stator winding 22 of the generator 20 and ground. The field current modulation switch 12 is repeatedly switched between an ON state and an OFF state by the field current modulation switch driver 14, such that the duty cycle (or ON/OFF pulse width) of the field current modulation switch 12 maintains the field current flowing trough the exciter stator winding 22 at a given level as a function of load.

During normal operation, the field current $I_f$ should be kept continuous to maintain a ripple-free POR voltage and to reduce the voltage noise across the field current modulation switch 12 during its switching. The free wheeling diode 16 is connected between lines 17 and 18, the anode being connected to line 18 between an output end of the exciter stator winding 22 and the field current modulation switch 12 and the cathode being connected to line 17 between an input end of the exciter stator winding 22 and a DC power source (not shown), and bypasses excitation energy stored in the exciter stator winding 22 when the field current modulation switch 12 is OFF. When the field current modulation switch 12 is ON, the diode 16 is reverse-biased and is in a blocking state. Therefore, excitation current on line 18 from the exciter stator winding 22 goes to ground through the field current modulation switch 12. When the field current modulation switch 12 is in the OFF state, the diode 16 is forced on by the induced voltage of the exciter stator winding 22 and the energy in the winding keeps flowing through the diode 16 via the line 18 so that the current flowing though the diode 16 is included in the field current $I_f$ that is fed to the input end of the exciter stator winding 22 via line 17, thereby achieving a smooth continuous field current $I_f$. Thus, the diode 16 creates a free-wheeling path for excitation energy from the exciter stator winding 22.

For aircraft with traditional fixed frequency electrical systems that normally operate around 400 Hz, the conventional configuration in FIG. 1 does not pose a serious performance problem. The inventors of this application have found, however, that problems may arise in variable frequency systems that have gained more attention in recent years. For a typical aircraft, electric power generated from a generator has to meet power characteristic requirements dictated by either the industry or military standards. One typical requirement is the maximum voltage overshoot and recovery time during a step load removal transient elsewhere in the electric power utilization system. In a variable frequency generator control system, in which the generator speed range can be wide from 10000 to 24000 revolutions-per-minute, if the energy stored in the exciter winding cannot be depleted quickly enough when the field current modulation switch is OFF, the voltage overshoot often exceeds acceptable levels when the load is taken off from the generator at high speed, especially when a large generator is used. Furthermore, during generator power-up at high generator speeds, the generator voltage can be excessive due to inability of the generator control unit to accurately ramp-up the excitation current because energy stored in the exciter stator winding does not decay fast enough. Because there is not much that can be done to solve these problems with existing conventional control compensation in standard generator control units, a product cannot be delivered to a customer if it fails to meet the customer's voltage overshoot tolerances.

SUMMARY OF THE INVENTION

In accordance with the present invention, the above drawbacks of the conventional power generator control configuration are resolved through use of a generator control unit that selectively and temporarily introduces an energy absorbing circuit into an excitation current free-wheeling path to absorb residual energy from a generator winding, thereby accelerating the field current decay rate to reduce voltage overshoot in the generator. According to the present invention, the energy absorbing circuit is selectively and temporarily introduced into the excitation current free-wheeling path when the generator experiences a load transition (e.g., a transition from high load to low load) and/or during a power-up stage to reduce voltage overshoot.

According to an embodiment of the present invention, a power generator control unit includes a field current modulator that is repeatedly switched between an ON state and an OFF state to control the flow of field current to the an exciter winding of the power generator, and excitation current from the exciter winding is fed back to the generator via a free-wheeling diode when the field current modulator is OFF. An energy absorbing circuit is selectively added to the free-wheeling path. A by-pass switch is provided across the energy absorbing circuit, which my be an RC circuit, to provide, when in an ON state, a low-impedance path for excitation current to flow in the free-wheeling path. In this implementation, the generator control unit includes an impedance by-pass driver that changes the by-pass switch from an ON state to an OFF state as a function of one or more detection signals, e.g., indicating a load transition or power-up condition, to selectively and temporarily introduce the energy absorbing circuit into the free-wheeling path to accelerate decay of the excitation current from an exciter winding of the generator.

BRIEF DESCRIPTION OF THE DRAWINGS

Other aspects and advantages of the present invention will become apparent upon reading the following detailed description and upon reference to the drawings, in which.

DETAILED DESCRIPTION

Figure 1:
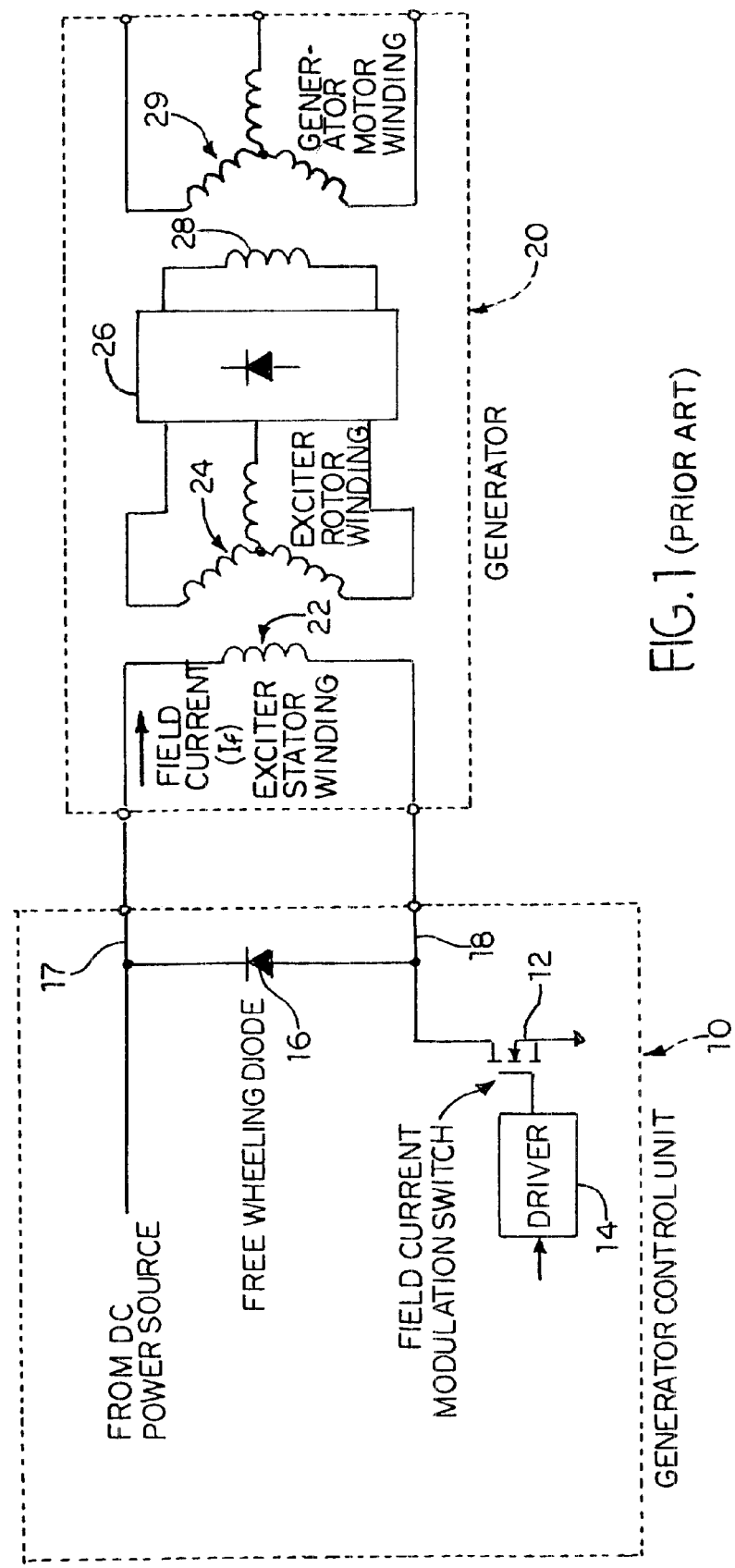
FIG. 1 is a circuit diagram illustrating a conventional configuration for controlling field current supplied to a power generator.
Figure 2:
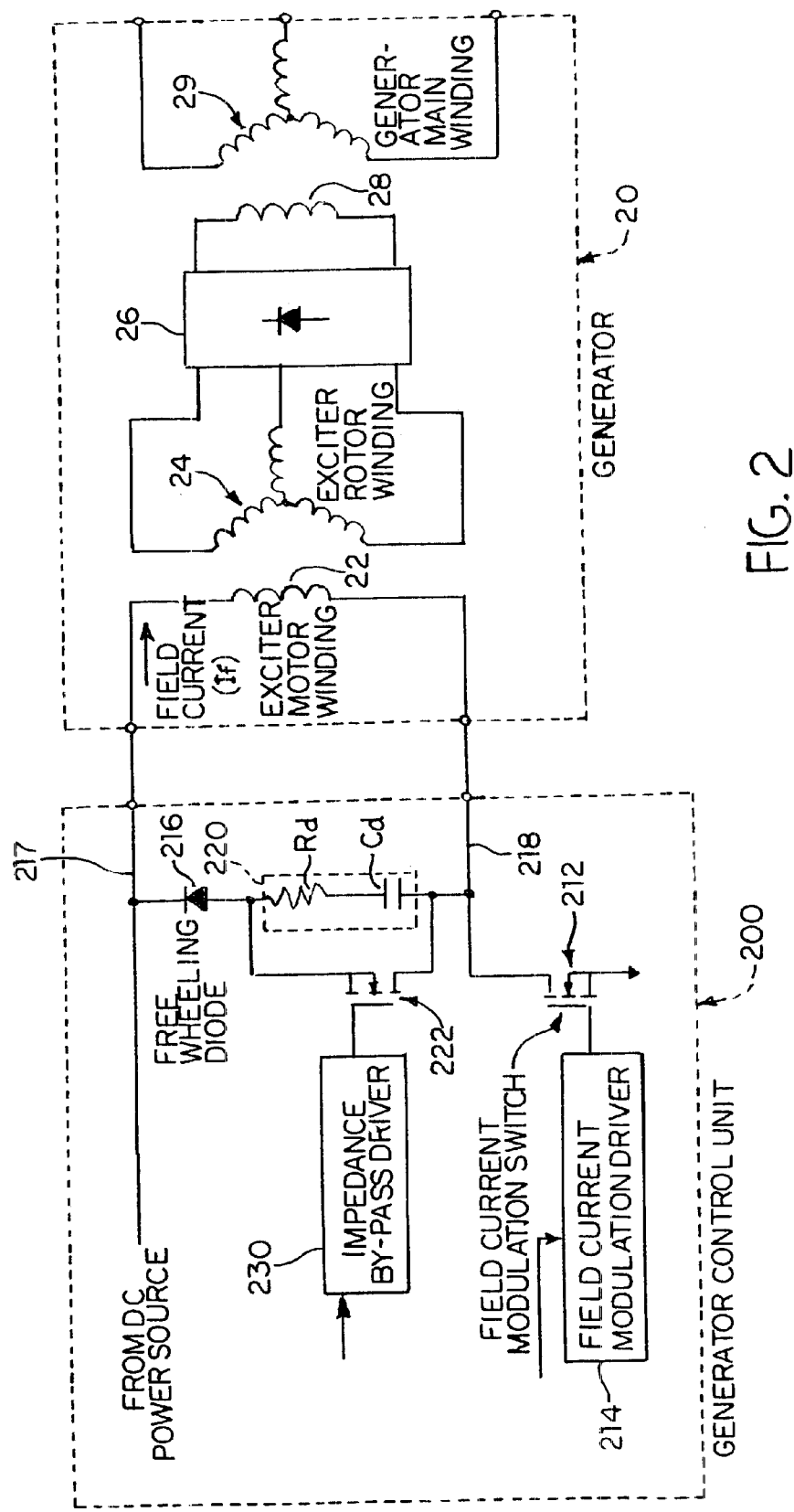
FIG. 2 is a circuit diagram illustrating a configuration for controlling field current supplied to a power generator in accordance with an embodiment of the present invention.

FIG. 2 illustrates a configuration of a generator control unit 200 in accordance with an embodiment of the present invention, which reduces voltage overshoot in a generator 20 during operating transitions, e.g., during load removal. As seen in FIG. 2, the generator control unit 200 includes: (a) a field current modulation switch 212; (b) a field current modulation driver 214; (c) a free wheeling diode 216; (d) an impedance circuit 220; (e) an impedance circuit by-pass switch 222; and (e) an impedance by-pass driver 230. Like the conventional configuration discussed above with reference to FIG. 1, the generator control unit 200 is connected to an exciter stator winding 22 of a generator 20 via lines 217 and 218 to provide a field current $I_f$. In the exemplary implementation illustrated in FIG. 2, the generator 20 also includes an exciter rotor winding 24, a rectifier 26, a field winding 28, and a generator main winding 29. The flow of field current $I_f$ through the exciter stator winding 22 induces a voltage in an exciter rotor winding 24 of the generator 20, which is rectified by the rectifier 26. The resulting rectified voltage is applied to the field winding 28, which induces an AC voltage in the generator main winding 29 for distribution to electrical loads of the aircraft via feeders (not shown). Although a particular AC generator configuration is illustrated in FIG. 2, it should be apparent to those skilled in the art that generator control principles of the present invention may be applied to various generator configurations.

The field current modulation switch 212 may be a MOSFET, an IGBT, or other suitable switching device. As seen in FIG. 2, the field current modulation switch 212 is connected between ground and line 218. The field current modulation driver 214 is connected to the gate of the field current modulation switch 212 to repeatedly switch the field current modulation switch 212 between an ON state and an OFF state. The duty cycle (ON/OFF pulse width) of the current modulation switch 212 is a function of load on the generator 20, such that the field current modulation driver 214 effects a higher duty cycle for the field current modulation switch 212 at higher loads to maintain the POR voltage at a given level as function of load.

The free wheeling diode 216 is connected between line 217 and a first end of the impedance circuit 220, the second end of the impedance circuit 220 being connected to line 218 between the field current modulation switch 212 and the exciter stator winding 22 of the generator 20. The impedance circuit by-pass switch 222 is provided across the impedance circuit 220. Like the field current modulation switch 212, the impedance by-pass switch 222 may be a MOSFET, an IGBT, or another suitable switching device. For example, the impedance by-pass switch 222 may be implemented as a mechanical relay. The impedance by-pass driver 230 is connected to the gate of the impedance circuit bypass switch 222 to selectively drive the switch 222 ON and OFF. In the embodiment illustrated in FIG. 2, the impedance circuit 220 includes a resistor $R_d$ and a capacitor $C_d$ connected in series, the values of which will depend on specific characteristics of the generator design. It should be realized that alternative configurations for the impedance circuit 220 may be used. For example, a resistor $R_d$ alone may be used instead of an RC circuit to provide a simpler design or a more complex impedance circuit may be used. Still further, the RC circuit may be replaced by a voltage source that effectively stops the flow of field current.

Operation of the generator control unit 200 illustrated in FIG. 2 will next be described. When the field current modulation switch 212 is driven ON by the field current modulation driver 214, excitation current on line 218 from the exciter stator winding 22 goes to ground through the field current modulation switch 212. When the field current modulation switch 212 is driven OFF by the field current modulation driver 214 and the impedance circuit by-pass switch 230 is driven ON by the impedance by-pass driver 230, excitation current on line 218 from the exciter stator winding 22 flows through the impedance circuit by-pass switch 222 (by-passing the impedance circuit 220) and the diode 216 to line 217, thereby being fed back to the exciter stator winding 22 of the generator 20 as a component of field current $I_f$, thereby achieving a smooth continuous field current $I_f$.

During certain operating transitions such as load-removal and power-up, the field current modulation driver 214 maintains the field current modulation switch 212 in the OFF state and the impedance by-pass driver 230 maintains the impedance circuit by-pass switch in the OFF state so that the impedance circuit 220 is temporarily introduced into the excitation current free-wheeling path between lines 218 and 217, thereby absorbing most of the residual energy from the exciter stator winding 22 of the generator 20. As a result, the POR voltage in the generator 20, which is directly related to field current $I_f$, will decrease quickly and remain within acceptable limits.

Figure 4A:
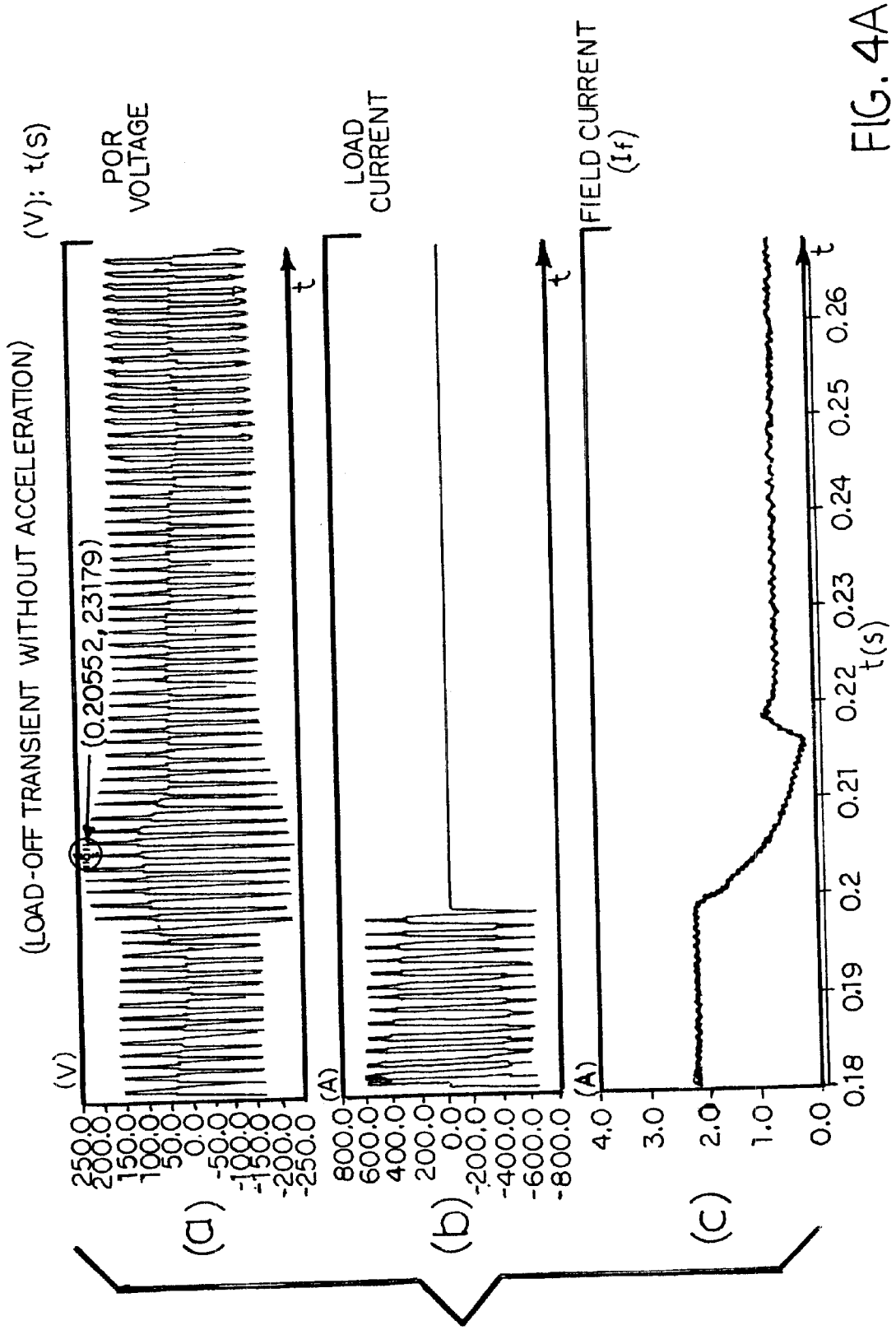
FIG. 4A shows a series of waveforms demonstrating a typical voltage overshoot condition that occurs during load removal when principles of the present invention are not applied to power generation control.
Figure 4B:
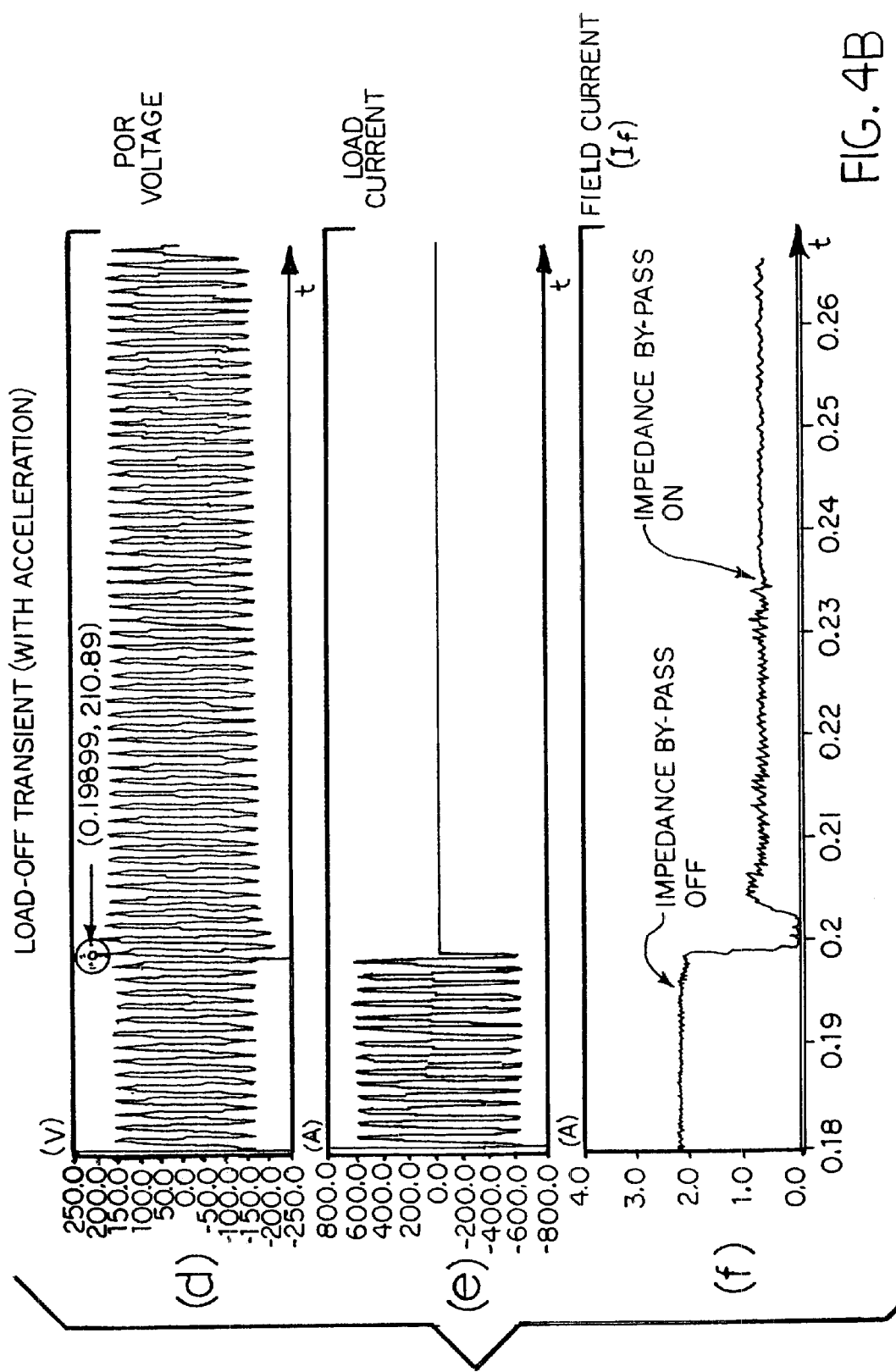
FIG. 4B shows a series of waveforms demonstrating the effects of the an exemplary implementation of the present invention in reducing voltage overshoot during load removal.

FIGS. 4A–4B include waveforms (a)–(f) to illustrate the effectiveness of the present invention in decreasing field current $I_f$ following load removal and reducing POR voltage overshoot. FIG. 4A illustrates a voltage overshoot condition that may occur when load is removed from the generator 20 and the principles of the present invention are not applied. When the load ceases to draw current (load removal), as shown in waveform (b), the voltage at the POR significantly overshoots, as seen in waveform (a), until the field current $I_f$, shown in waveform (c) decays over time. As seen in waveform (c), the field current $I_f$ decays gradually when the principles of the present invention are not applied, thereby prolonging the voltage overshoot condition seen in waveform (a). FIG. 4B illustrates the effects of the present invention on reducing voltage overshoot. In contrast to waveform (c) in FIG. 4A, it can be seen from waveform (f) that introducing the impedance circuit 220 into the free-wheeling path by turning the impedance circuit by-pass switch 222 to the OFF state significantly accelerates decay of field current $I_f$, thereby reducing voltage overshoot (as seen in waveform (d) of FIG. 4B). As seen in waveform (f) of FIG. 4B, the impedance circuit 220 is introduced only temporarily into the feedback path, otherwise the field excitation energy will be absorbed each time the field current modulation switch 212 is OFF, thereby causing discontinuous field current $I_f$ and heat dissipation. For most generators, a 100 milliseconds OFF time for the impedance circuit by-pass switch 222 will be sufficient.

It should be recognized that the waveforms of FIGS. 4A and 4B are merely provided to illustrate principles of the present invention and should not be considered as limiting the scope of the present invention. The waveforms of FIGS. 4B are based on a 150 KVA brushless synchronous generator at 23100 rpm, $R_d$=12 ohm, and $C_d$=0.47 $\mu$F.

Figure 3:
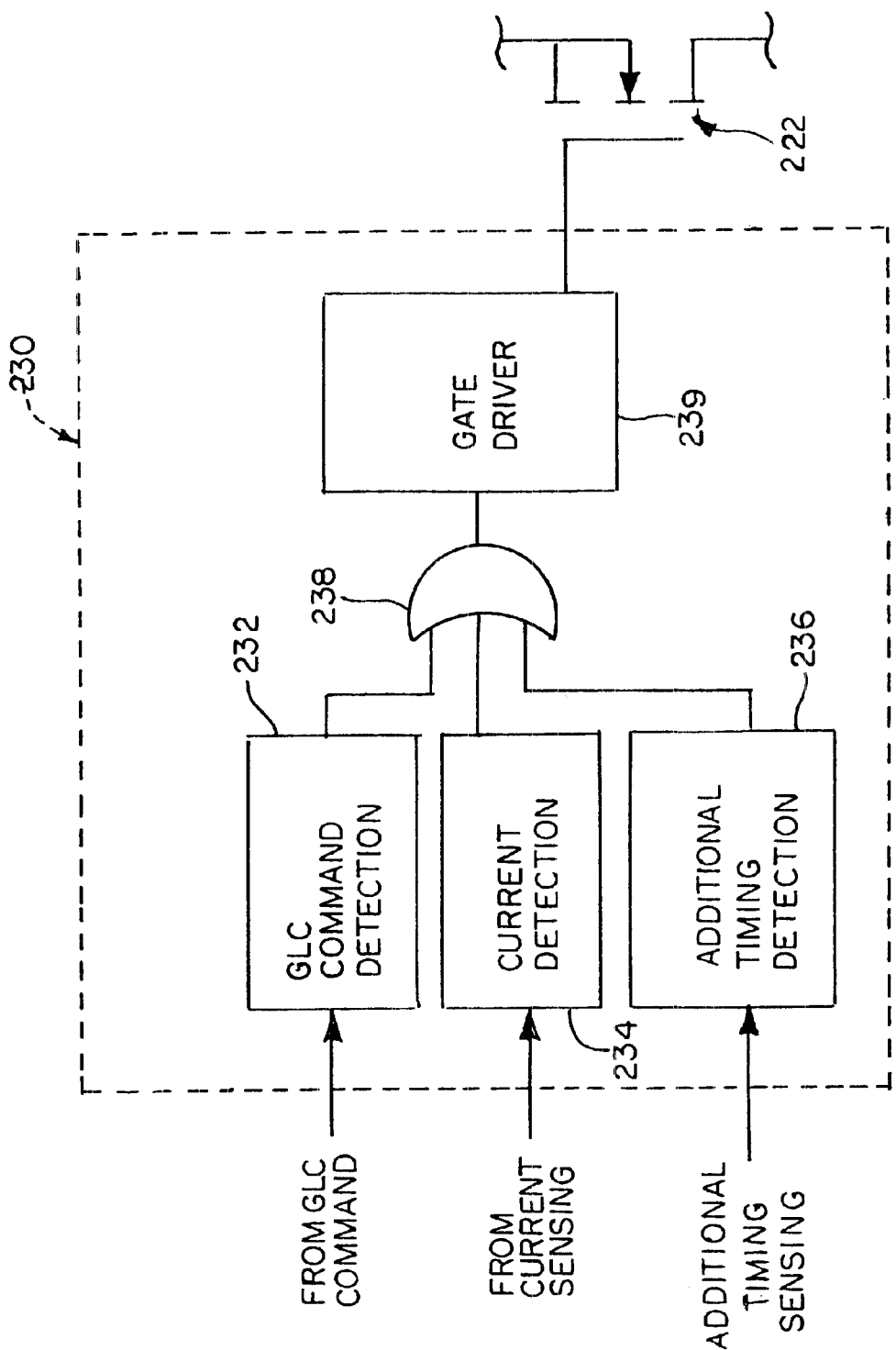
FIG. 3 is a diagram illustrating an exemplary configuration of a by-pass driver suitable for use in the embodiment of the present invention illustrated in FIG. 2.

The impedance by-pass driver 230 may be configured in a variety of ways to control the impedance circuit by-pass switch 222 so that the impedance circuit 220 is introduced into the free-wheeling path at appropriate timing (e.g., at load-removal or power-up). FIG. 3 shows an exemplary configuration of the impedance by-pass driver 230. As seen in FIG. 3, the impedance by-pass driver 230 may include a GLC (generator line contactor) command detection unit 232, a current detection unit 234, and an additional timing detection unit 236, respectively receiving a GLC command signal, a current sensing signal, and an additional timing sensing signal and each outputting a detection signal to an OR gate 238. The output of the OR gate 238 is connected to a gate driver 239 that generates a gating signal for the impedance circuit by-pass switch 222. As is well known, the GLC command is a command generated by the generator control unit 200 to close and release the GLC. When the GLC is released, the load is removed from the generator 20 or the generator is in a power-up stage. Therefore, the GLC command signal may be used as a control signal by the impedance by-pass driver 230 so as to drive the impedance circuit by-pass switch 222 to the OFF state upon occurrence of the GLC command. The impedance by-pass driver 230 may also use a current sensing signal, as detected by the current detection unit 234, as a control signal. For example, a large drop in current drawn from the generator may indicate a load removal state and no current from the generator 20 may indicate a power-up state, during which the impedance circuit 220 is to be introduced into the freewheeling path of the generator control unit 200. Additional timing signals, as detected by the additional timing detection unit 236, may be used as control signals by the impedance by-pass driver 230.

The foregoing merely illustrates the principles of the invention. It will be appreciated that those skilled in the art will be able to devise various arrangements which, although not explicitly described or shown herein, embody the sprit and scope of the present invention. For example, all the invention has been described for use with an AC synchronous generator, it may also be applied to a DC generator.

We claim:

1. A generator control apparatus for supplying field current to a power generator, comprising:

a field current modulator that repeatedly switches between an ON state and an OFF state to control a flow of field current to said power generator;

a free-wheeling path that, when said field current modulator is in the OFF state, feeds excitation current received from said generator back to said power generator as a field current component; and an impedance circuit that selectively and temporarily absorbs excitation current in said free-wheeling path when said field current modulator is in the OFF state to reduce voltage overshoot in said power generator upon occurrence of an operating transition.

2. The invention as defined in claim 1, further comprising:

an impedance circuit by-pass connected across said impedance circuit, said impedance circuit by-pass selectively providing a low-impedance path across said impedance circuit so that said impedance circuit does not absorb excitation current.

3. The invention as defined in claim 2, wherein said impedance circuit by-pass (222) is a transistor.

4. The invention as defined in claim 2, further comprising:

an impedance circuit by-pass controller that switches said impedance circuit by-pass between an ON state and an OFF state.

5. The invention as defined in claim 1, wherein said free-wheeling path includes a freewheeling diode receiving an output of said impedance circuit.

6. The invention as defined in claim 1, wherein said field current modulator is a transistor.

7. The invention as defined in claim 1, further comprising:

a field current modulation switch driver that repeatedly switches said field current modulator between the ON state, in which excitation current from said generator is sent to ground, and the OFF state, in which excitation current from said generator is received by said free-wheeling path.

8. The invention as defined in claim 1, wherein said impedance circuit absorbs excitation current in said free-wheeling path following load-removal to reduce output voltage overshoot of said power generator.

9. The invention as defined by claim 1, wherein said impedance circuit absorbs excitation current in said free-wheeling path during power-up of said power generator.

10. The invention as defined by claim 1, wherein said impedance circuit selectively and temporarily absorbs excitation current in said freewheeling path based on a generator line contactor command.

11. The invention as defined by claim 1, wherein said impedance circuit is an RC circuit.

12. A method of controlling a power generator, said method comprising:

repeatedly switching a field current modulator between an ON state and an OFF state to control a flow of field current to said power generator;

feeding excitation current, via a free-wheeling path, back to said power generator as a field current component when said field current modulator is in the OFF state; and selectively and temporarily absorbing excitation current in said freewheeling path, using an impedance circuit, to reduce voltage overshoot of said power generator upon occurrence of an operating transition.

13. The invention as defined in claim 12, further comprising:
controlling an impedance circuit by-pass connected across said impedance circuit to selectively provide a low-impedance path across said impedance circuit so that said impedance circuit does not absorb excitation current.

14. The invention as defined in claim 12, wherein said field current modulator sends excitation current from said generator to ground when in said ON state.

15. The invention as defined in claim 12, wherein said step of selectively absorbing excitation current in said free-wheeling path introduces impedance into said freewheeling path following load-removal to reduce output voltage overshoot of said power generator.

16. The invention as defined by claim 12, wherein said step of selectively absorbing excitation current absorbs excitation current in said free-wheeling path during power-up of said power generator to reduce voltage overshoot.

17. The invention as defined by claim 12, wherein said step of selectively absorbing excitation current absorbs excitation current in said free-wheeling path based on a generator line contactor command.

18. The invention as defined by claim 12, wherein said impedance circuit is an RC circuit.

19. A generator control apparatus for supplying field current to a power generator, comprising:
field current modulation means for controlling a flow of field current to said power generator by repeatedly switching between an ON state and an OFF state;
means for feeding excitation current, via a free-wheeling path, to said power generator as a field current component when said field modulation means is in the OFF state; and
means for selectively and temporarily absorbing excitation current in said free-wheeling path to reduce voltage overshoot of said power generator upon occurrence of an operating transition.

20. The invention as defined in claim 19, further comprising:
means for selectively providing a low-impedance path across said means for selectively absorbing excitation current.

21. The invention as defined in claim 19, wherein said means for selectively absorbing excitation current absorbs excitation current in said free-wheeling path following load-removal to reduce output voltage overshoot of said power generator.

22. The invention as defined by claim 19, wherein said means for selectively absorbing excitation current absorbs excitation current in said free-wheeling path during power-up of said power generator.

23. The invention as defined by claim 19, wherein said means for selectively absorbing excitation current absorbs excitation current in said free-wheeling path based on a generator line contactor command.

24. The invention as defined in claim 12, wherein said free-wheeling path includes a freewheeling diode, which is forward biased when said field current modulator is in the OFF state.

25. The invention as defined in claim 19, wherein said free-wheeling path includes a freewheeling diode, which is forward biased when said field current modulation means is in the OFF state.

26. The invention as defined in claim 19, wherein said means for selectively and temporarily absorbing excitation current in said free-wheeling path includes an RC circuit.

27. The invention as defined in claim 1, wherein said free-wheeling path, when said field current modulator is in the OFF state, feeds excitation current induced in an exciter motor winding of said generator back to said power generator.

28. The invention as defined in claim 12, wherein said free-wheeling path, when said field current modulator is in the OFF state, feeds excitation current induced in an exciter motor winding of said generator back to said power generator.

29. The invention as defined in claim 19, wherein said free-wheeling path, when said field current modulator is in the OFF state, feeds excitation current induced in an exciter motor winding of said generator back to said power generator.

\* \* \* \* \*